(12) United States Patent
Sugiura et al.

(10) Patent No.: US 7,612,485 B2
(45) Date of Patent: Nov. 3, 2009

(54) ULTRASONIC SENSOR

(75) Inventors: Makiko Sugiura, Hekinan (JP); Kazuaki Watanabe, Nagoya (JP); Yasuyuki Okuda, Aichi-gun (JP)

(73) Assignee: DENSO CORPORATION, Kariya (JP)

( * ) Notice: Subject to any disclaimer, the term of this patent is extended or adjusted under 35 U.S.C. 154(b) by 113 days.

(21) Appl. No.: 11/898,521

(22) Filed: Sep. 13, 2007

(65) Prior Publication Data

US 2008/0073998 A1 Mar. 27, 2008

(30) Foreign Application Priority Data

Sep. 26, 2006 (JP) ............... 2006-260737

(51) Int. Cl.
*H01L 41/08* (2006.01)
*H01L 41/053* (2006.01)

(52) U.S. Cl. ..................... 310/324; 310/334

(58) Field of Classification Search ........... 310/311, 310/334, 335, 324, 322, 336–337; 73/627–629; H01L 41/08, 41/083, 41/053
See application file for complete search history.

(56) References Cited

U.S. PATENT DOCUMENTS 5,664,456 A * 9/1997 Eckert ................. 310/324

7,411,335 B2 * 8/2008 Eckert et al. ................. 310/334
2007/0144261 A1 6/2007 Okuda et al.

FOREIGN PATENT DOCUMENTS

| JP | A-10-224895 | 8/1998 |
|---|---|---|
| JP | 10-224895 | * 10/1998 |
| JP | A-2003-284182 | 10/2003 |

* cited by examiner

*Primary Examiner*—Walter Benson
*Assistant Examiner*—Karen B Addison
(74) *Attorney, Agent, or Firm*—Posz Law Group, PLC

(57) ABSTRACT

An ultrasonic sensor for detecting an ultrasonic wave, which is output from an ultrasonic generator and reflected by an object to be detected, the ultrasonic sensor includes: an acoustic matching layer having a first surface and a second surface, the first surface which receives the ultrasonic wave, and the second surface which is opposite to the first surface; and an ultrasonic detection element including a vibration member. The vibration member is coupled with the second surface of the acoustic matching layer. The acoustic matching layer is repeatedly deformable in accordance with a standing wave, which is generated in the acoustic matching layer by the received ultrasonic wave. The vibration member resonates with the repeat deformation of the acoustic matching layer.

12 Claims, 7 Drawing Sheets

ULTRASONIC SENSOR

CROSS REFERENCE TO RELATED APPLICATION

This application is based on Japanese Patent Application No. 2006-260737 filed on Sep. 26, 2006, the disclosure of which is incorporated herein by reference.

FIELD OF THE INVENTION

The present invention relates to an ultrasonic sensor.

BACKGROUND OF THE INVENTION

A conventional ultrasonic sensor includes an ultrasonic transducer disposed on a substrate made from material such as metal and resin. The ultrasonic sensor is mounted to, for example, a vehicle. The ultrasonic sensor sends an ultrasonic wave to an object and receives the ultrasonic wave reflected by the object. The sending and receiving of the ultrasonic wave is done by an element capable of sending and receiving the ultrasonic wave. The wave sent and received provides information on an object around the vehicle, such as a location of the object, a distance from the object, a two-dimensional shape of the object and a three dimensional shape of the object.

Some of the ultrasonic sensors include an acoustic matching layer that controls acoustic impedance. The acoustic matching layer improves efficiency of the sending and receiving of the ultrasonic wave. An example of the ultrasonic sensor having the acoustic matching layer is shown in JP-A-H10-224895 where an acoustic matching layer, which is made from synthetic resin including glass balloons, is fixed to one side of the ultrasonic sensor.

Since the ultrasonic sensor is attached to an exposed place of an apparatus such as the vehicle, the downsizing of the ultrasonic sensor is required in order to avoid spoil of the beauty of the apparatus. Specifically, diminish in the apparent area of the acoustic matching layer is needed. Diminishing in the size of the acoustic matching layer requires the downsizing of an ultrasonic detection element that is attached to the acoustic matching layer. When bulky piezoelectric material is used for the ultrasonic detection element, it is difficult for the ultrasonic detection element to resonate with the vibration of the acoustic matching layer with increasing the reception sensitivity and improving the detection sensitivity to the ultrasonic wave. The problem is that it has been difficult to balance two goals for the downsizing of the acoustic matching layer and the improving of the detection sensitivity to the ultrasonic wave. Thus it is required for the ultrasonic sensor to improve the detection sensitivity and to minimize its dimension.

SUMMARY OF THE INVENTION

In view of the above-described problem, it is an object of the present disclosure to provide an ultrasonic sensor. According to an aspect of the present disclosure, an ultrasonic sensor for detecting an ultrasonic wave, which is output from an ultrasonic generator and reflected by an object to be detected, the ultrasonic sensor includes: an acoustic matching layer having a first surface and a second surface, the first surface which receives the ultrasonic wave, and the second surface which is opposite to the first surface; and an ultrasonic detection element including a vibration member. The vibration member is coupled with the second surface of the acoustic matching layer. The acoustic matching layer is repeatedly deformable in accordance with a standing wave, which is generated in the acoustic matching layer by the received ultrasonic wave. The vibration member resonates with the repeat deformation of the acoustic matching layer.

According to the above ultrasonic sensor, the vibration member of the ultrasonic detection element resonates with the repeat deformation of the acoustic matching layer. The repeat deformation is caused by the standing wave in the acoustic matching layer, the standing wave which is generated by the ultrasonic wave received by the first surface of the acoustic matching layer. Thus the configuration increases the vibration amplitude of the vibration member and thus the detection sensitivity of the ultrasonic sensor to the ultrasonic wave is improved. Here the increase of the vibration amplitude is independent from the area of the first surface of the acoustic matching layer. Therefore the downsizing of the acoustic matching layer is realized, and the ultrasonic sensor having improved detection sensitivity to the ultrasonic wave is realized.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1A:
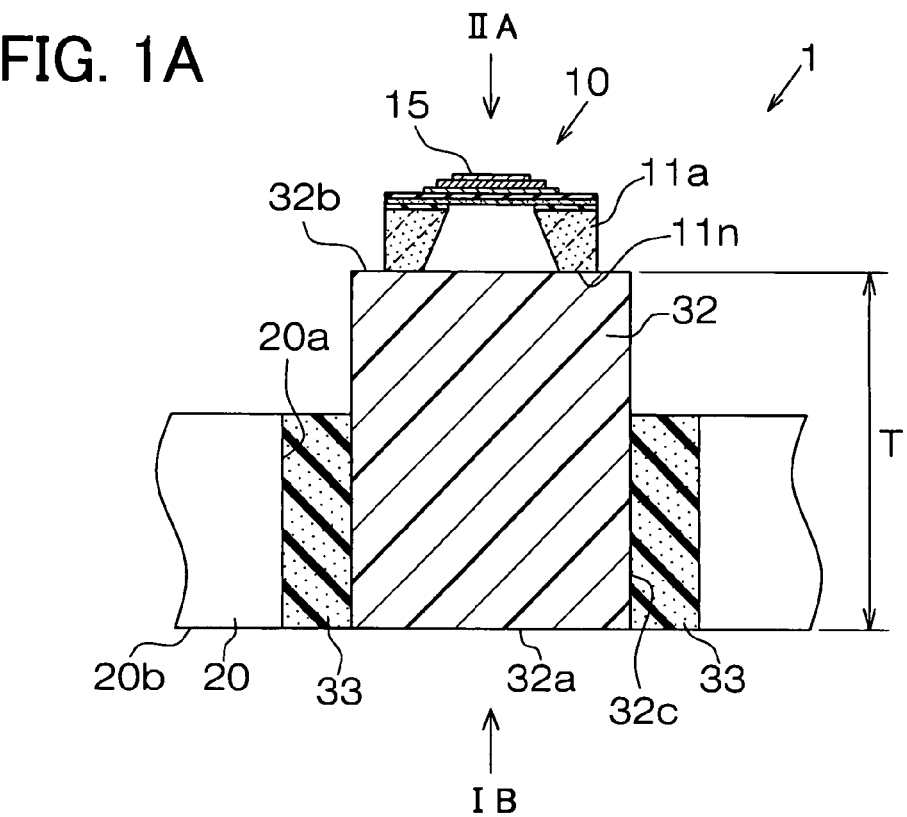
FIG. 1A is a vertical cross-sectional view of an ultrasonic sensor according to a first embodiment of the present invention.
Figure 1B:
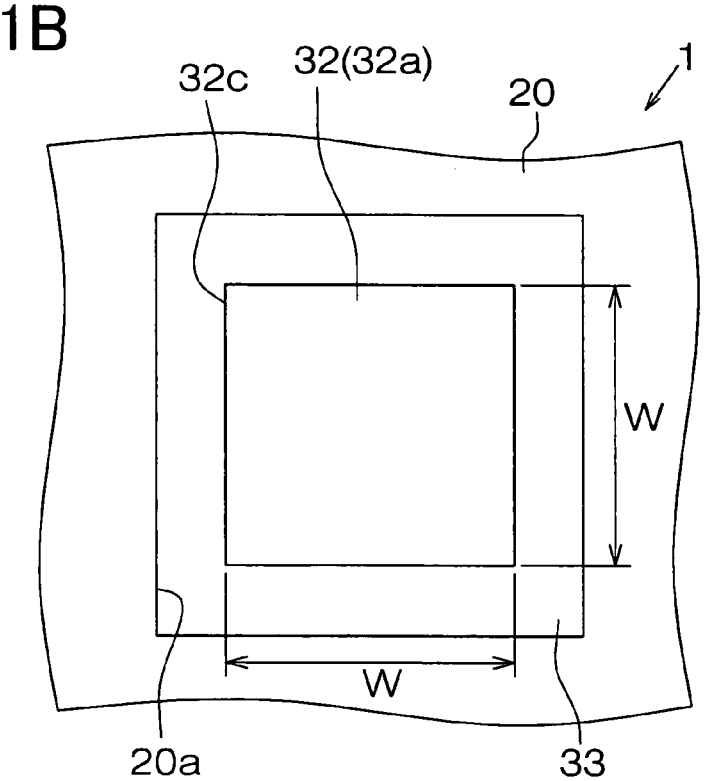
FIG. 1B is a plan view of the ultrasonic sensor where the view is taken from one side of an acoustic matching layer (cf. an arrow IB in FIG. 1A)
Figure 2A:
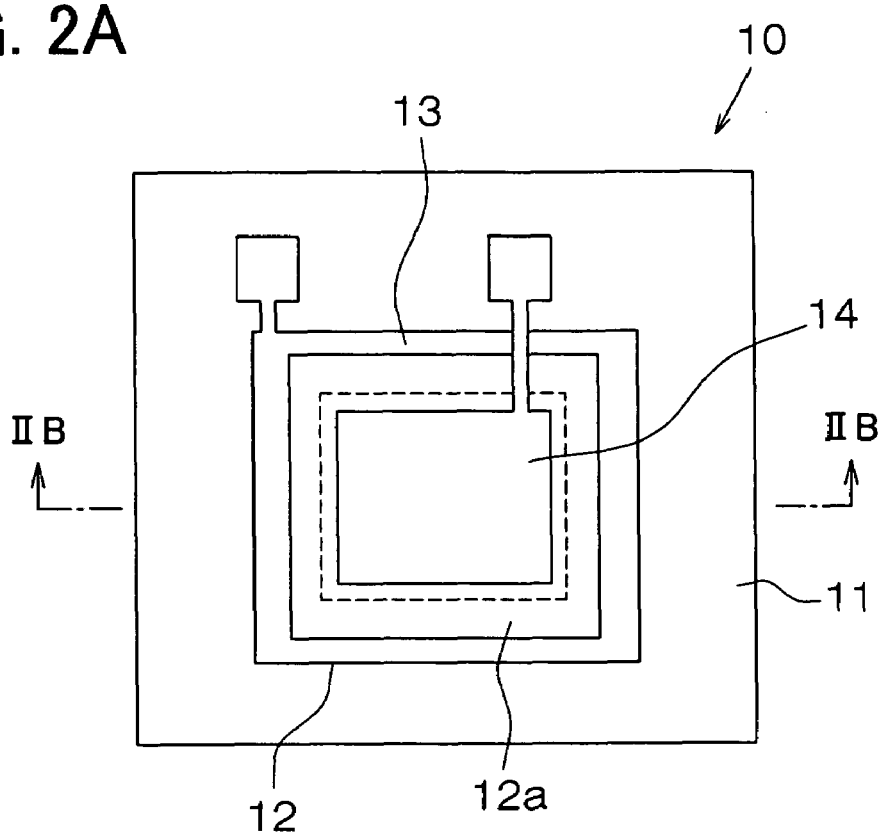
FIG. 2A is a schematic view of an ultrasonic detection element where the view direction of FIG. 2A corresponds to an arrow IIA in FIG. 1A.
Figure 2B:
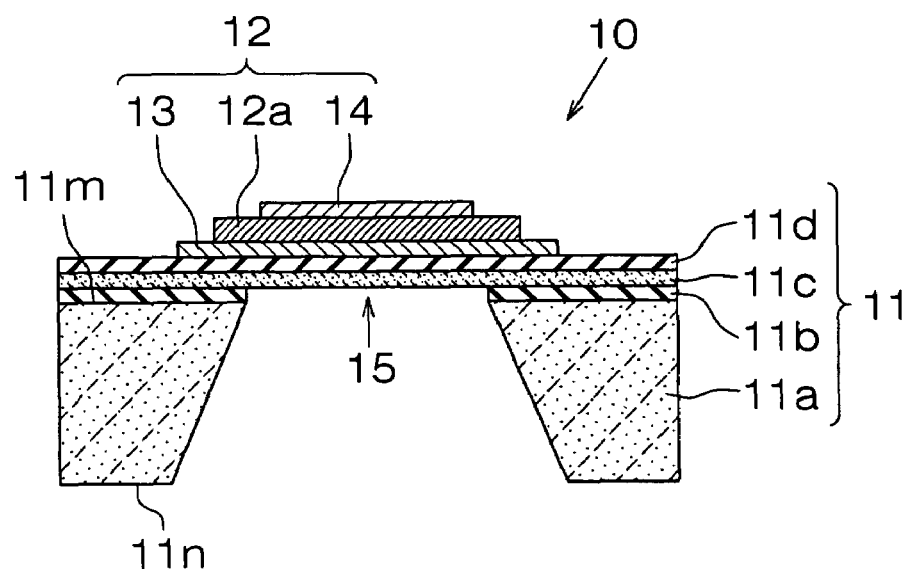
FIG. 2B is a cross sectional view of the ultrasonic detection element where the view is taken along line IIB-IIB in FIG. 2A.
Figure 3A:
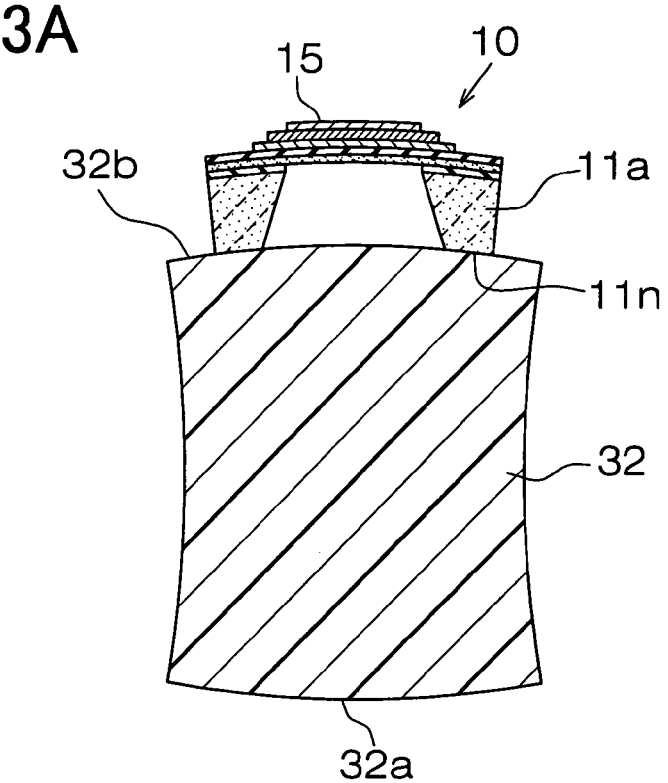
FIGS. 3A and 3B are conceptual diagrams of deformations of the acoustic matching layer, where the deformations are caused by a standing wave in the acoustic matching layer.
Figure 3B:
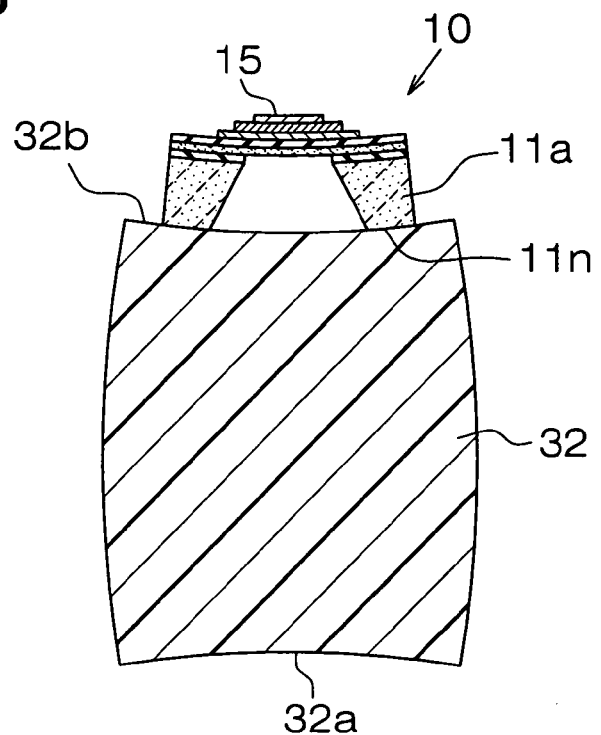
Figure 4:
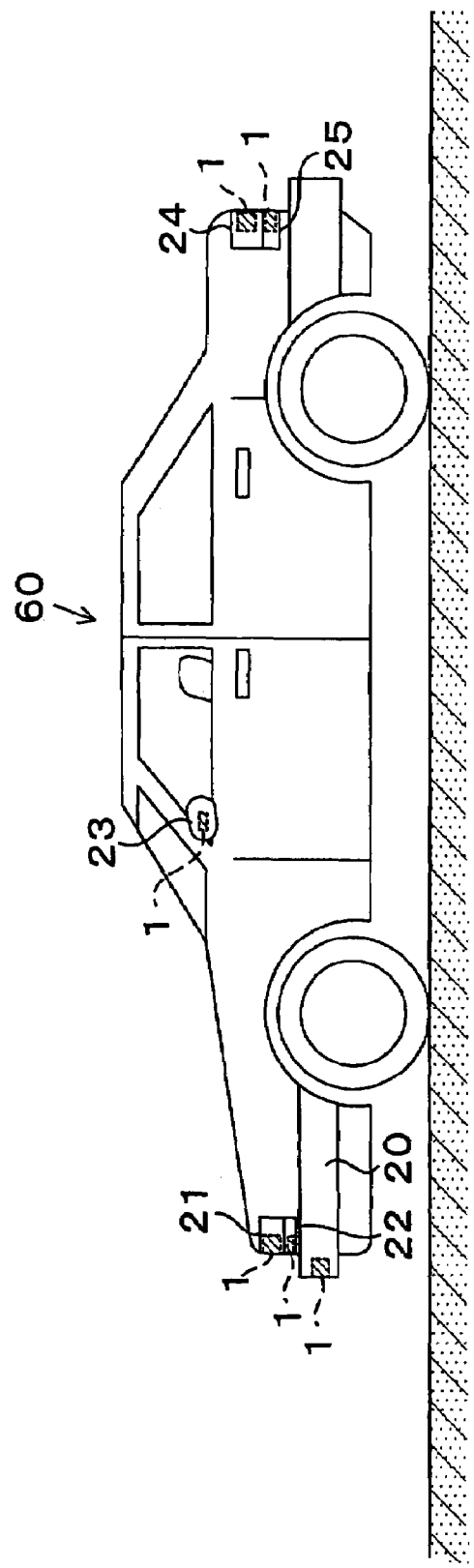
FIG. 4 is an explanatory diagram for explaining vehicle places, to which an ultrasonic sensor is mounted.

An ultrasonic sensor shown hereafter is a form of an obstacle sensor mounted to a vehicle, which is an example of the uses of the ultrasonic sensor. FIGS. 1A and 1B show schematic views of an ultrasonic sensor according to a first embodiment. FIG. 1A shows a vertical cross-sectional view of the ultrasonic sensor. FIG. 1B shows a plan view of the ultrasonic sensor where the view is taken from the side of an acoustic matching layer (cf. an arrow IB in FIG. 1A). FIGS. 2A and 2B show a schematic view of an ultrasonic detection element 10. The view direction of FIG. 2A corresponds to an arrow IIA in FIG. 1A. The view of FIG. 2B is a cross sectional view taken along line IIB-IIB in FIG. 2A. FIGS. 3A and 3B are conceptual diagram of a deformation of the acoustic matching layer 32 due to a standing wave. FIG. 4 shows example places for mounting the ultrasonic sensor to the vehicle. The direction from the vehicle internal to the vehicle external is expressed as the arrow IIA in FIG. 1A and the front side of FIG. 1B.

The ultrasonic sensor 1 according to the first embodiment includes an acoustic matching layer 32 and an ultrasonic detection element 10, as shown in FIGS. 1A and 1B. The ultrasonic detection element 10 sends an ultrasonic wave toward a forward side of the vehicle, and then detects the wave reflected by an object located on the forward space of the vehicle. The acoustic matching layer 32 receives the reflected wave and transmits a vibration to the ultrasonic detection element 10.

The acoustic matching layer has a reception surface (a first surface) and a mounting surface (a second surface). The mounting surface 32b is opposite to the reception surface 32a. The reception surface 32a is the surface for the receiving of the reflected wave. The ultrasonic detection element 10 is connected to the center of the mounting surface 32b of the acoustic matching layer 32. A bottom surface 11n of the support 11a is connected to the acoustic matching layer 32 with using joining material. The acoustic matching layer 32 is attached to an appropriate place of a vehicle 60. In this embodiment, the ultrasonic sensor 1 is mounted on a bumper 20 (cf. FIG. 4).

The bumper 20 has a mounting member 20a for connecting the acoustic matching layer 32 with the bumper 20. The mounting member 20a is configured to be a hole for insertion of the acoustic matching layer 32. The acoustic matching layer 32 is connected to the mounting member 20a via a vibration damper 33 in such a manner that the reception surface 32a is exposed to an outside of the bumper 20. The vibration damper 33 is attached to the side surface 32c of the acoustic matching layer 32 where the side surface 32c is near the reception surface 32a. There is no bump on the outside surface that is made of the reception surface 32a, the vibration damper 33 and the bumper 20. The outside surface is smooth and flat.

The ultrasonic detection element 10 is formed based on a rectangular-shaped semiconductor substrate 11 of SOI (Silicon On Insulator), as shown FIGS. 2A and 2B. The semiconductor substrate 11 is configured to be multi-layered: a first insulating film 11b, a silicon active layer 11c, a second insulating film 11d in this order. The ultrasonic detection element 10, the multi-layer, is disposed on a top surface 11m of the support 11a. It should be note that other materials such as glassy material may be used for the substrate.

The central parts of both the support 11a and the first insulating film 11b are removed with the use of MEMS technique (Micro Electro Mechanical System). The removed parts are rectangular shapes (the location of the removed parts corresponds to that of the central part of the semiconductor substrate 11). The support 11a and the first insulating film 11b have the rectangular holes. The silicon active layer 11c and the second insulating film 11d are rectangular films.

A piezoelectric vibration detection element 12 is formed on the second insulating film 11d. The piezoelectric vibration detection element 12 includes a piezoelectric film 12a, a bottom electrode 13 and a top electrode 14. The piezoelectric film 12a is disposed between the bottom electrode 13 and the top electrode 14. Material for the piezoelectric film 12a is, for example, lead zirconate titanate (PZT). A vibration member 15 is suspended by a periphery of the support 11a. The support 11a (i.e., a transmission member) transmits a vibration to the vibration member 15. A resonance frequency of the vibration member 15 is controlled with changing shape of elements, such as with changing the shape of the piezoelectric film 12a, bottom electrode 13 and the top electrode 14, and the hole size of the support 11a. Thus, when MEMS technique is used for the processing, the resonance frequency is controlled without changing the total size of the ultrasonic detection element 10. The vibration member 15 is configured so that the vibration member 15 resonates with repeat deformation of the acoustic matching layer 32, where the repeat deformation is due to an induced standing wave. The converting of the deformation into a voltage signal by the piezoelectric vibration detection element 12 gives the detection of the ultrasonic wave.

The acoustic matching layer 32 is made from material whose acoustic impedance is higher than air's acoustic impedance. The shape of the acoustic matching layer 32 is a four-sided prism whose cross-section is almost square.

The acoustic matching layer 32 suppresses an ultrasonic-wave reflection at the boundary between an air and the acoustic matching layer 32. The suppression of the wave reflection increases the amount of the ultrasonic wave received. The material of the acoustic matching layer 32 is, for example, resin having a durable characteristic such as polycarbonate. The small change of the polycarbonate's elastic constant with temperature results in the small change of an ultrasonic-wave-length in the acoustic matching layer 32. The use of the material such as the polycarbonate provides the stable generation of the standing wave.

The ultrasonic detection element 10 is attached to a place unapparent from the outside of the bumper 20. Thus, the acoustic matching layer 32 may be a protector of the ultrasonic detection element 10 against a substance such as a droplet and dust. When the acoustic matching layer 32 is made from resin, a thickness T of the acoustic matching layer becomes larger compared to a case that the acoustic matching layer is made from metal. Therefore the acoustic matching layer 32 made from the resin effectively operates as the protector.

The thickness T of the acoustic matching layer 32 is configured to be one-fourth wave-length of the ultrasonic wave where the wave length is the value measured in the acoustic matching layer 32. The width W of the acoustic matching layer 32 is configured to be smaller than half of the wave-length of the ultrasonic wave where the wave length is the value measured in the air. When the frequency of the ultrasonic wave is set to 65 kHz, the width W and the thickness T are to be 2.6 mm and 5.0 mm, respectively.

The thickness T of one-fourth wave-length provides generation of a standing wave in the acoustic matching layer 32. This reduces the interference and the resulting cancellation of the following waves: an ultrasonic wave incident into the acoustic matching layer 32 and a wave reflected from the boundary between the acoustic matching layer 32 and the ultrasonic detection element 10. Therefore the ultrasonic wave is efficiently transmitted to the ultrasonic detection element 10.

The acoustic matching layer 32 is made of resin. Alternatively, the acoustic matching layer 32 may be made of other materials such as ceramic, glass and metal (aluminum etc.) as long as the materials satisfy the appropriate acoustic-impedance condition and the relation of the element size to the wave length. Since the materials have characteristics of a whetherproof and an environment resistance, the materials may be used for the acoustic matching layer 32.

The shape of the acoustic matching layer 32 is the four-sided prism whose cross section is almost square. Alternatively, the shape of the acoustic matching layer 32 is other shapes such as a cylinder shape. When multiple ultrasonic sensors 1 may be disposed in an array, the width W of the acoustic matching layer 32 smaller than half of the ultrasonic wave-length enables the sensors to detect the ultrasonic wave with high detection accuracy. Here the distance of each acoustic matching layer 32 is half of the wavelength of the ultrasonic wave, the wavelength which is measured in the air. When multiple ultrasonic sensors 1 may not be disposed in an array, the width W of the acoustic matching layer 32 is not necessarily to be smaller than half of the wavelength of the ultrasonic wave.

The vibration damper 33 is disposed between the side surface 32c of the acoustic matching layer 32 and the mounting member 20a of the bumper 20 in order to connect them. The vibration damper 33 prevents vibration transmission between the bumper 20 and the mounting member 20a. The vibration damper 33 is fixed to the acoustic matching layer 32 and the mounting member 20a in such a manner that there arises no step on the outside surface made of the reception surface 32a and the bumper 20. With using a binding agent such as adhesive and glue, the vibration damper is fixed.

The vibration damper 33 is made from material having high acoustic damping constant and having impedance lower than that the material of the acoustic matching layer 32 has. The material of the vibration damper 33 is, for example, silicone rubber. Alternatively, the vibration damper 33 is made from material having a low elasticity and a low density. The Materials having a low elasticity and a low density are, for example, material including pores, such as rubber type material, form resin and sponge. The vibration damper 33, which is made of the materials and is disposed between the bumper 20 and the acoustic standing layer 32, prevents the noise generation caused by the ultrasonic wave transmission between the mounting member 20a of the bumper 20 and the side surface 32c of the acoustic matching layer 32. Material having a low elasticity weakly constrains the vibration in the acoustic matching layer 32, which results in a small ultrasonic vibration attenuation in the acoustic matching layer 32.

When the reception surface 32a of the acoustic matching layer 32 receives an ultrasonic wave, the acoustic matching layer 32 resonates with the ultrasonic wave, and a standing wave arises in the acoustic matching layer 32. The standing wave provides the repeat expansion and contraction in the thickness direction with the acoustic matching layer 32. When the acoustic matching layer 32 expands in the thickness direction, the acoustic matching layer 32 contracts in the width direction, as illustrated in FIG. 3A. In this deformation, the mounting surface 32b is outwardly convex. The vibration member 15 is also outwardly convex because the support 11a of the ultrasonic detection element 10 opens out laterally. When the acoustic matching layer 32 contracts in the thickness direction, the acoustic matching layer 32 expands in the width direction, as illustrated in FIG. 3B. In this deformation, the mounting surface 32b is outwardly concave. The vibration member 15 is also outwardly concave because the support 11a of the ultrasonic detection element 10 closes up laterally.

More specifically, the vibration member 15 of the ultrasonic detection element 10 repeatedly bends with synchronizing with the repeat deformation of the acoustic matching layer 32. The repeat deformation of the acoustic matching layer 32 is due to the standing wave. The repeat deformation of the ultrasonic detection element 10 is converted into the voltage signal. This conversion leads to the detection of the ultrasonic wave.

Since the resonance frequency of the vibration member 15 is the frequency of the repeat deformation of the acoustic matching layer 32 (i.e., the frequency of the induced standing wave), a large deflection deformation of the vibration member 15 is realized. The large deflection deformation increases amplitude of the signal output from the ultrasonic detection element 10. The increase in the signal amplitude improves the detection sensitivity to the ultrasonic wave.

A circuit, which is electronically connected to the ultrasonic detection element 10 (the circuit which is not shown in FIGS), is electronically connected to ECU. The ECU executes an arithmetic processing based on the signal output from the ultrasonic detection element 10. The ECU determines, for example, time-lag or phase-difference between the ultrasonic waves sent and received. This provides the detection of the obstacle and the measurement of the distance between the obstacle and the vehicle.

When a color tone of the ultrasonic sensor 1 matches that of the bumper 20, the ultrasonic sensor 1 becomes unnoticeable. The color matching is realized with the selecting of material of the sensor as well as the painting of the ultrasonic detection element 10 and the acoustic matching layer 32 with an appropriate color. Therefore it is possible to configure the ultrasonic sensor 1 having decent design, and keep the beauty of the bumper 20.

The ultrasonic sensor 1 is mounted to the bumper 20. Alternatively, the ultrasonic sensor 1 is mounted to a head-lamp cover 21 of the vehicle 60, as shown in FIG. 4. In this configuration, the ultrasonic wave reflected by an obstacle is not intercepted by parts of the vehicle, and the ultrasonic wave reflected is reliably detected by the ultrasonic sensor 1. This configuration may be effective in applying the ultrasonic sensor 1 to an obstacle sensor.

The ultrasonic sensor 1 may be attached to other parts of the vehicle according to its use. When the ultrasonic senor 1 is used for an obstacle sensor for detecting an obstacle being lateral to the vehicle, the sensor 1 is attached to, for example, a blinker cover 22 or a side mirror 23. When the sensor 1 is used for an obstacle sensor for detecting an obstacle behind the vehicle, the sensor 1 is attached to a rear lamp cover 24 or a back-up light cover 25.

In this embodiment, the support 11a and the first insulating film 11b are the plate whose central part is removed. Alternatively, the support 11a and the first insulating film 11b may be plates whose central parts are not removed. The silicon active layer 11c and the second insulating film 11d are films having a square shape. The ultrasonic sensor 1 is may be amounted to not only the vehicle 60 but also other apparatus such as a toy and a robot for indoor use.

The ultrasonic sensor 1 operates as follows.

The vibration member 15 of the ultrasonic detection element 10 resonates with the repeat deformation of the acoustic matching layer 32. The repeat deformation arises from the standing wave generated by the incident ultrasonic wave received by the reception surface 32a of the acoustic matching layer 32. The configuration increases the vibration amplitude of the vibration member 15 where the increase is independent from the area of the reception surface 32a of the acoustic matching layer 32. Therefore the downsizing of the acoustic matching layer 32 is realized, and the detection sensitivity to the ultrasonic wave is improved.

The ultrasonic detection element 10 is formed with applying MEMS technique to the semiconductor substrate 11. Since the vibration member 15 is thin wall parts of the semiconductor substrate 11, the resonance frequency is able to be set to a given value without changing the entire size of the sensor. This enables the ultrasonic sensor 1 to be downsized, and thus the acoustic matching layer 32 attached to the ultrasonic sensor 1 is downsized. The structure of the thin-walled vibration member 15 realizes the increase in a deformation volume of the vibration member 15. The increase in the deformation volume improves the detection sensitivity to the ultrasonic wave.

The piezoelectric vibration detection element 12 is made from lead zirconate titanate (PZT), which has a large value of a piezoelectric constant. Since the piezoelectricity of the piezoelectric vibration detection element 12 detects the strain produced by the resonant vibration, a strong signal is output from the ultrasonic detection element 10. The strain in the vibration member 15 is converted into the voltage signal. The high reception sensitivity to the ultrasonic wave improves the detection sensitivity to the wave.

When the acoustic matching layer 32 is formed from resin, the thickness T of the acoustic matching layer 32 is larger than that formed from metal. The acoustic matching layer 32 of the resin effectively acts as a protector of the ultrasonic detection element 10 against a collision with a substance such as a droplet and a dust particle. When the acoustic matching layer 32 is formed from the polycarbonate whose elasticity slightly changes with temperature, a resultant small change of the wave-length with temperature allows the stable generation of the induced standing wave.

The ultrasonic sensor 1 according to the first embodiment is mounted to a large variety place of the vehicle 60. The place to which the ultrasonic sensor 1 is mounted depends on its use. Examples are as follows. When the ultrasonic sensor 1 is used for detecting an obstacle disposed on a forward side of the vehicle, the ultrasonic sensor 1 is attached to either the headlamp cover 21 or the bumper 20. When the ultrasonic sensor 1 is used for detecting an obstacle being lateral to the vehicle, the ultrasonic sensor 1 is attached to either the blinker cover 22 or the side mirror 23. When the ultrasonic sensor 1 is used for detecting an obstacle behind the vehicle, the ultrasonic sensor 1 is attached to either the rear lamp cover 24 or the back-up light cover 25.

Second Embodiment

Figure 5A:
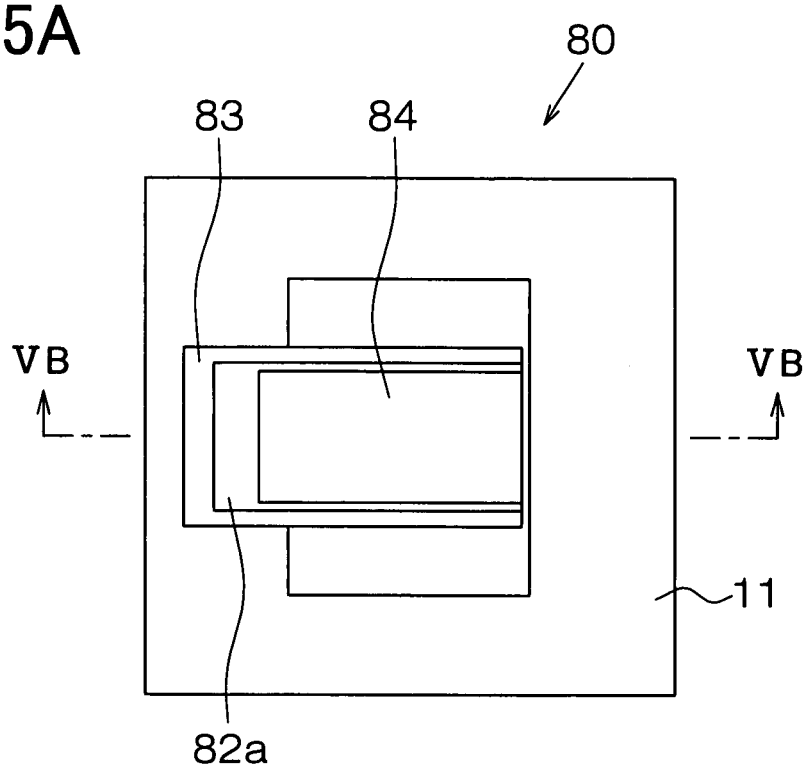
FIG. 5A is a plain view of an ultrasonic sensor according to a second embodiment of the present invention where the view is taken from the vehicle internal.
Figure 5B:
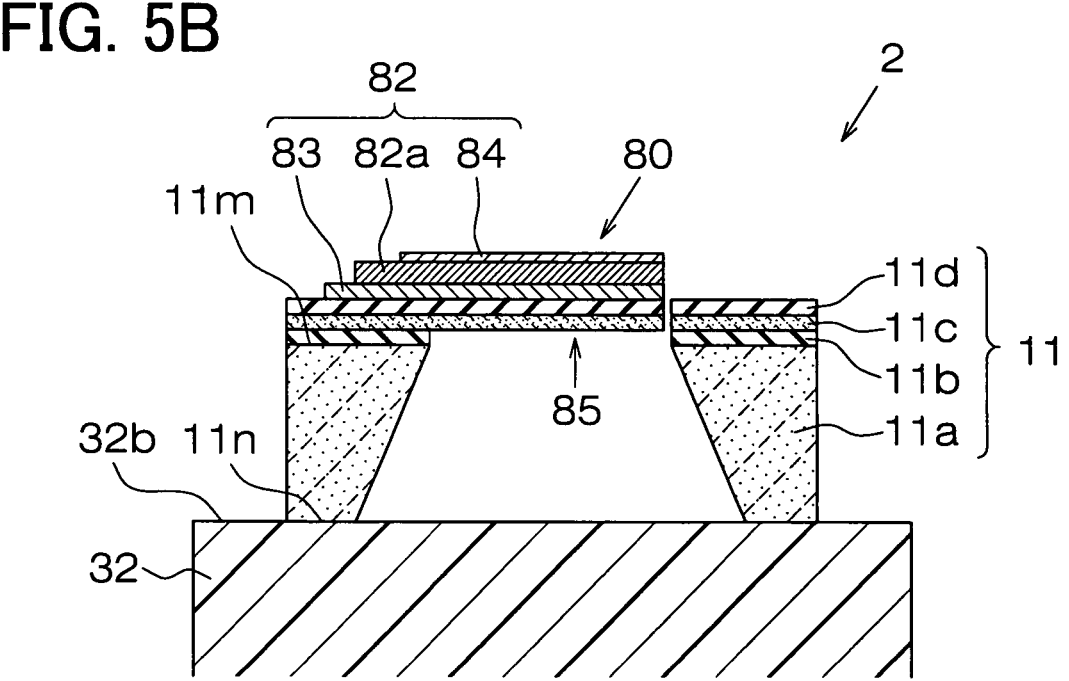
FIG. 5B is a cross sectional view of the ultrasonic sensor where the view is taken along line VB-VB in FIG. 5A.
Figure 6:
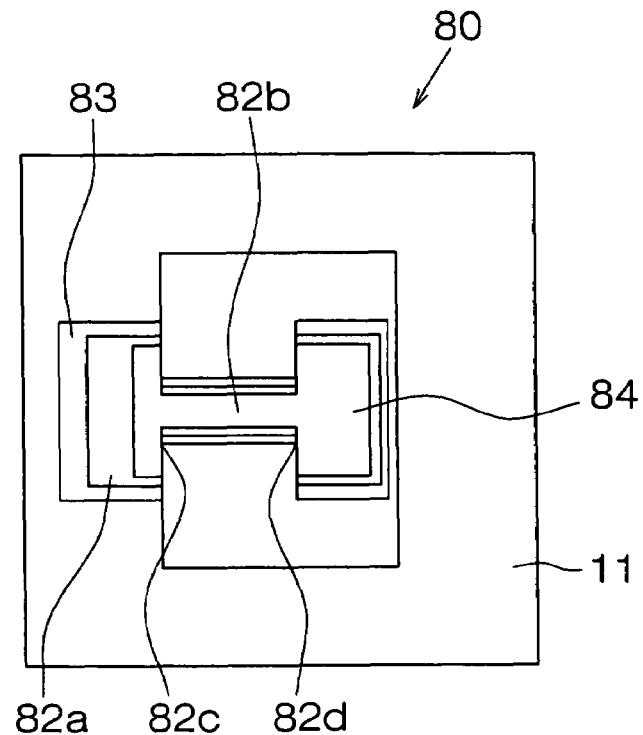
FIG. 6 is a schematic diagram for explaining a modification example of the second embodiment.

FIGS. 5A and 5B are schematic views of a part of an ultrasonic sensor 2 according to the second embodiment. FIG. 5A shows a plain view of the ultrasonic sensor 2 where the view is taken from the vehicle internal. FIG. 5B is a cross sectional view of the ultrasonic sensor 2 where the view is taken along line VB-VB in FIG. 5A. FIG. 6 is a diagram for explaining a modification example according to the second embodiment.

The ultrasonic sensor 2 according to the second embodiment includes an ultrasonic detection element 80 whose vibration member 85 is cantilevered. As shown in FIGS. 5A and 5B, the vibration member 85 of the ultrasonic detection element 80 is multilayered. Each layer is disposed in following order: a silicon active layer 11c, a second insulating film 11d and a piezoelectric vibration detection element 82. In the piezoelectric vibration detection element 82, a piezoelectric film 82A is disposed between a bottom electrode 83 and a top electrode 84. The multilayer is cantilevered from the support 11a. The cantilever configuration mentioned above results in a larger deformation of the vibration member 85 in comparison to the case that both ends of the vibration member 85 are supported. Therefore the detection sensitivity to the ultrasonic wave is improved.

The removing of a part of the vibration member 85 decreases its stiffness. The decrease of the stiffness provides a large deformation with the vibration member 85. FIG. 6 shows an example shape of the vibration member 85 where the vibration member 85 is dumbbell shape. As shown in FIG. 6, there is a connection 82B around the center of the vibration member 85. The dumbbell shape configuration concentrates the stress into a region around the ends (82C and 82D) of the connection 82B and especially around the end 82C of the cantilevered side. The resultant large deformation improves the detection sensitivity to the ultrasonic wave.

Formation of the piezoelectric film 82A only around the ends (82C and 82D of the connection 82B) may be a modification according to the second embodiment. The modification reduces the piezoelectric film 82A area in which small deformation is given. The reducing of the area of the piezoelectric film 82A increases an output signal amplitude in comparison to a case that the area of piezoelectric film 82A is not reduced, and thus the detection sensitivity to the ultrasonic wave is improved. The configuration for enlarging the deformation with removing a part of the vibration member may be applied to the vibration member 15 according to the first embodiment.

The ultrasonic sensor 2 according to the second embodiment has an improved detection sensitivity to the ultrasonic wave. This is because the cantilevered structure of the vibration member 85 results in a large deformation of the vibration member 85.

Third Embodiment

Figure 7:
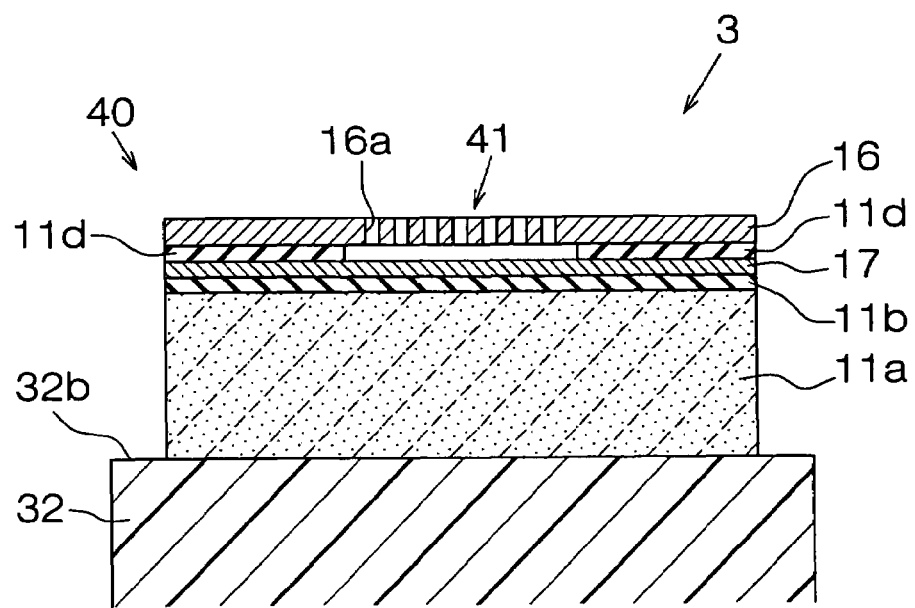
FIG. 7 is a schematic diagram of an ultrasonic sensor according to a third embodiment.

FIG. 7 shows an ultrasonic sensor 3 according to a third embodiment. For an ultrasonic detection element, the ultrasonic sensor 3 has an ultrasonic detection element 40, which includes a capacitor type vibration detection element 41. As shown in FIG. 7, the capacitor type vibration detection element 41 includes a first electrode 16 and a second electrode 17, which are facing each other. A capacitance change between the electrodes results in the detection of the ultrasonic wave. The first electrode 16 is formed on a first insulating film 11b. The second electrode 17 is disposed in a way that the two electrodes (16,17) have a given space between the first and second electrodes (16,17). Here, the central parts of the support 11a and the first insulating film 11b are not removed, and thereby, the support 11a and the first insulating film 11b have a flat plate shape.

The first electrode 16 is configured to be an appropriate shape (i.e., thickness and width etc.) in order to resonate with the repeat vibration of the acoustic matching layer 32. The first electrode 16 has at least one hole 16A extending completely across the plate of the first electrode 16. The hole suppresses the effect of the air on the vibration damping of the element 41. When the acoustic matching layer 32 receives the ultrasonic wave and has the standing wave therein, the capacitor type vibration detection element 41 vibrates. Since only the first electrode 16 resonates with the repeat deformation of the acoustic matching layer 32, the space between the first electrodes 16 and the second electrode 17 changes. The change of the capacitance between the electrodes, the electrodes which provides a capacitor, enables the sensor to detect the ultrasonic wave. Since the capacitor type vibration detection element 41 has a broad resonant frequency band. It is not required to manufacture the element 41 with high dimensional accuracy. Accordingly, the resonance of the element 41 is easily provided.

The support 11a and the first insulating film 11b have a flat plate shape. Alternatively, the support 11a and the first insulating film 11b is the plate having a rectangular hole at the center of the support 11a and the first insulating film 11b, respectively.

The vibration member of the ultrasonic sensor 3 according to the third embodiment includes a pair of the electrodes (i.e., the first electrode 16 and the second electrode 17). The capacitance change between these electrodes provides the detection of the vibration with the capacitor type vibration detection element 41. Since the capacitor type vibration detection element 41 has the broad resonance frequency band, it is not required to manufacture the element 41 with high dimensional accuracy. Accordingly, the resonance of the element 41 is easily provided.

Figure 8:
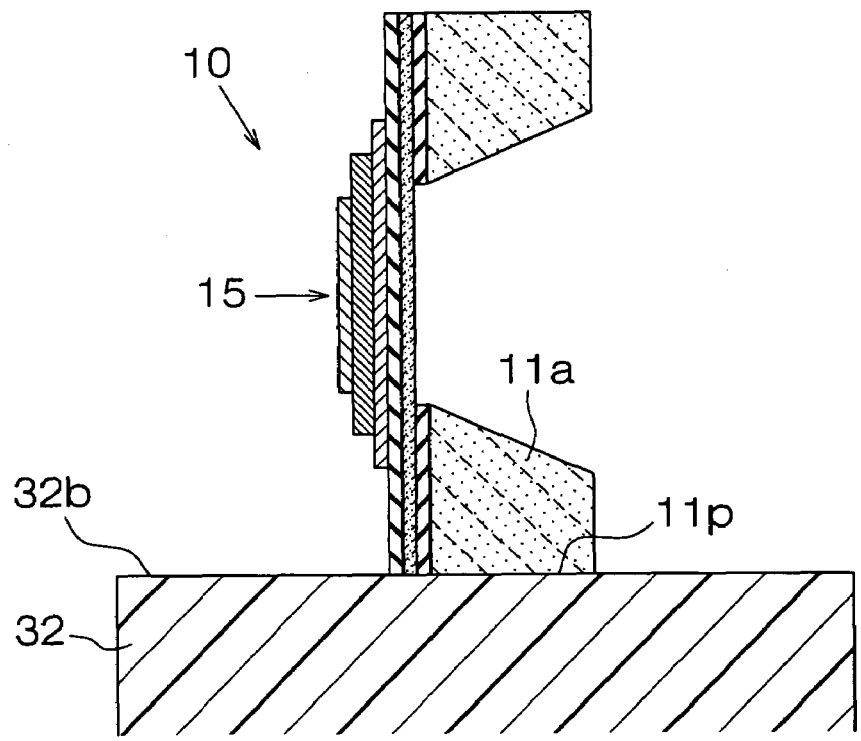
FIG. 8 is an schematic diagram for showing an example of a modification way to attach the ultrasonic detection element to acoustic matching layer.

Other embodiments (1) The ultrasonic detection element 10 is connected to the acoustic matching layer 32 in such a way that the vibration member 15 is almost perpendicular to the mounting surface 32b. A specific example of the configuration is shown in FIG. 8 in which the side surface 11p of the support 11 is fitted to the mounting surface 32b of the acoustic matching layer 32. In this configuration, the vibration member 15 is cantilevered from the mounting surface 32b. The vibration of the acoustic matching layer 32 in the width direction provides a large displacement with the vibration member 15. Therefore the detection sensitivity to the ultrasonic wave is improved.

Figure 9:
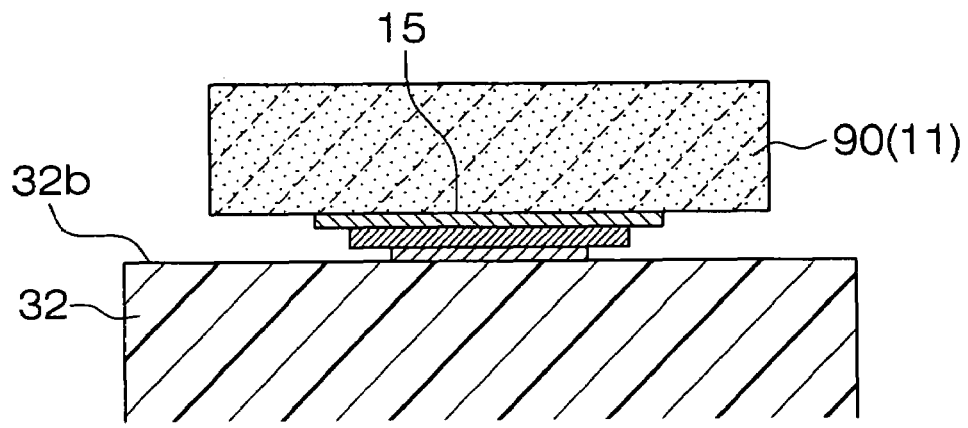
FIG. 9 is a schematic diagram for explaining a modification example of the ultrasonic detection element.

(2) As shown in FIG. 9, the vibration member 15 is combined with the member, to which the wave is transmitted from the acoustic matching layer 32. One side of the vibration member 15 is directly connected to the mounting surface 32b, and the opposite side of the vibration member 15 is connected to a vibration amplification element 90. The vibration amplification element 90 is the member for amplifying the deformation of the vibration member 15. In this configuration, the vibration amplification element 90 amplifies the deformation of the vibration member 15 in the width direction of the acoustic matching layer (the direction of the ultrasonic wave transmission). Therefore the detection sensitivity to the ultrasonic wave is improved. Material of the vibration amplification element 90 is, for example, semiconductor or glass.

(3) Although each embodiment stated above shows the ultrasonic detection element capable of receiving the ultrasonic wave, an element for sending the ultrasonic wave is may be used for the ultrasonic detection element. This configuration increases pressure of the ultrasonic wave sent by the acoustic matching layer 32.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An ultrasonic sensor for detecting an ultrasonic wave, which is output from an ultrasonic generator and reflected by an object to be detected, the ultrasonic sensor comprising:
an acoustic matching layer having a first surface and a second surface, the first surface which receives the ultrasonic wave, and the second surface which is opposite to the first surface;
an ultrasonic detection element including a vibration member; and
a transmission member disposed between the vibration member and the acoustic matching layer member, wherein
the vibration member is coupled with the second surface of the acoustic matching layer,
the acoustic matching layer is repeatedly deformable in accordance with a standing wave, which is generated in the acoustic matching layer by the received ultrasonic wave,
the vibration member resonates with the repeat deformation of the acoustic matching layer, and
the transmission member transmits the repeat deformation of the acoustic matching layer to the vibration member.

2. The ultrasonic sensor according claim 1, wherein
the ultrasonic detection element is provided by a Micro Electro Mechanical System, and the vibration member is provided by a thin portion of a semiconductor substrate.

3. The ultrasonic sensor according to claim 1, wherein
the vibration member includes a piezoelectric vibration detection element made from piezoelectric material, and
the piezoelectric vibration detection element detects the repeat deformation based on strain in the piezoelectric vibration detection element, the strain which is caused by the repeat deformation.

4. The ultrasonic sensor according to claim 3, wherein
the piezoelectric material is lead zirconate titanate.

5. The ultrasonic sensor according to claim 1, wherein
the vibration member includes a capacitor type vibration detection element including a pair of electrodes and a capacitor between the pair of electrodes, and
the capacitor has a capacitance changeable in accordance with displacement of the electrodes caused by the repeat deformation.

6. The ultrasonic sensor according to claim 1, wherein
the transmission member provides a support for supporting a periphery of the vibration member in such a manner that the support lifts up the vibration member.

7. The ultrasonic sensor according to claim 6, wherein
the vibration member is cantilevered from the support.

8. The ultrasonic sensor according to claim 1, wherein
the acoustic matching layer is made from resin material.

9. The ultrasonic sensor according to claim 8, wherein
the resin material is polycarbonate resin.

10. An ultrasonic sensor for detecting an ultrasonic wave, which is output from an ultrasonic generator and reflected by an object to be detected, the ultrasonic sensor comprising:
an acoustic matching layer having a first surface and a second surface, the first surface which receives the ultrasonic wave, and the second surface which is opposite to the first surface; and
an ultrasonic detection element including a vibration member, wherein
the vibration member is coupled with the second surface of the acoustic matching layer,
the acoustic matching layer is repeatedly deformable in accordance with a standing wave, which is generated in the acoustic matching layer by the received ultrasonic wave,
the vibration member resonates with the repeat deformation of the acoustic matching layer, and
the vibration member is almost perpendicular to the second surface of the acoustic matching layer.

11. The ultrasonic sensor according to claim 1, wherein
the ultrasonic sensor is mounted to at least one part of a vehicle, the one part which is selected from the group consisting of a headlamp cover, a rear lamp cover, a blinker cover, a back-up light cover, a side mirror and a bumper.

12. The ultrasonic sensor according to claim 10, wherein the ultrasonic sensor is mounted to at least one part of a vehicle, the one part which is selected from the group consisting of a headlamp cover, a rear lamp cover, a blinker cover, a back-up light cover, a side mirror and a bumper.

\* \* \* \* \*